June 7, 1949. O. L. GARRETSON 2,472,070
PRESSURE CONTROLLED LIQUID OUTLET VALVE
Filed April 15, 1946 3 Sheets-Sheet 1
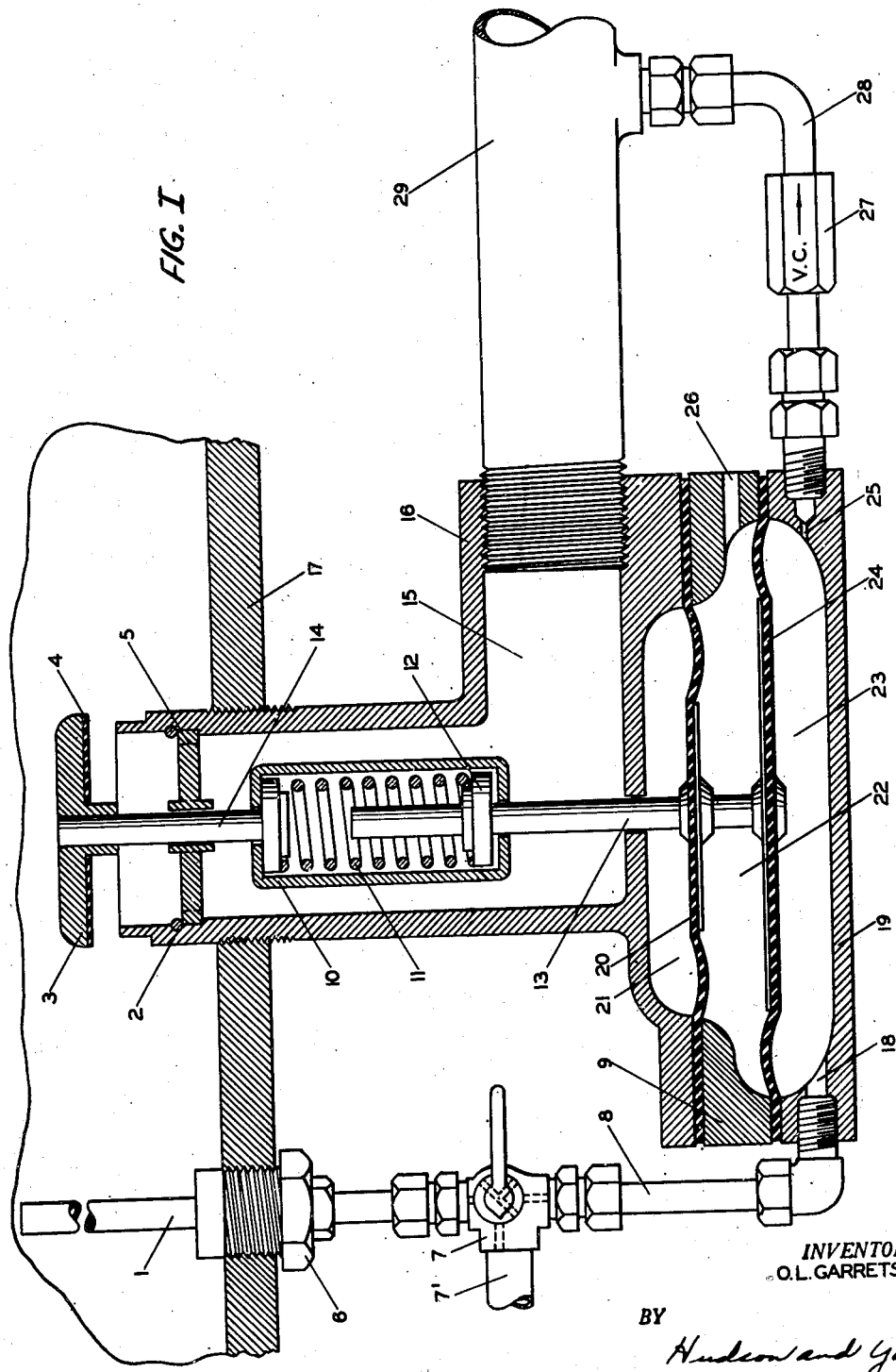
FIG. I
INVENTOR.
O. L. GARRETSON
BY
Hudson and Young
ATTORNEYS

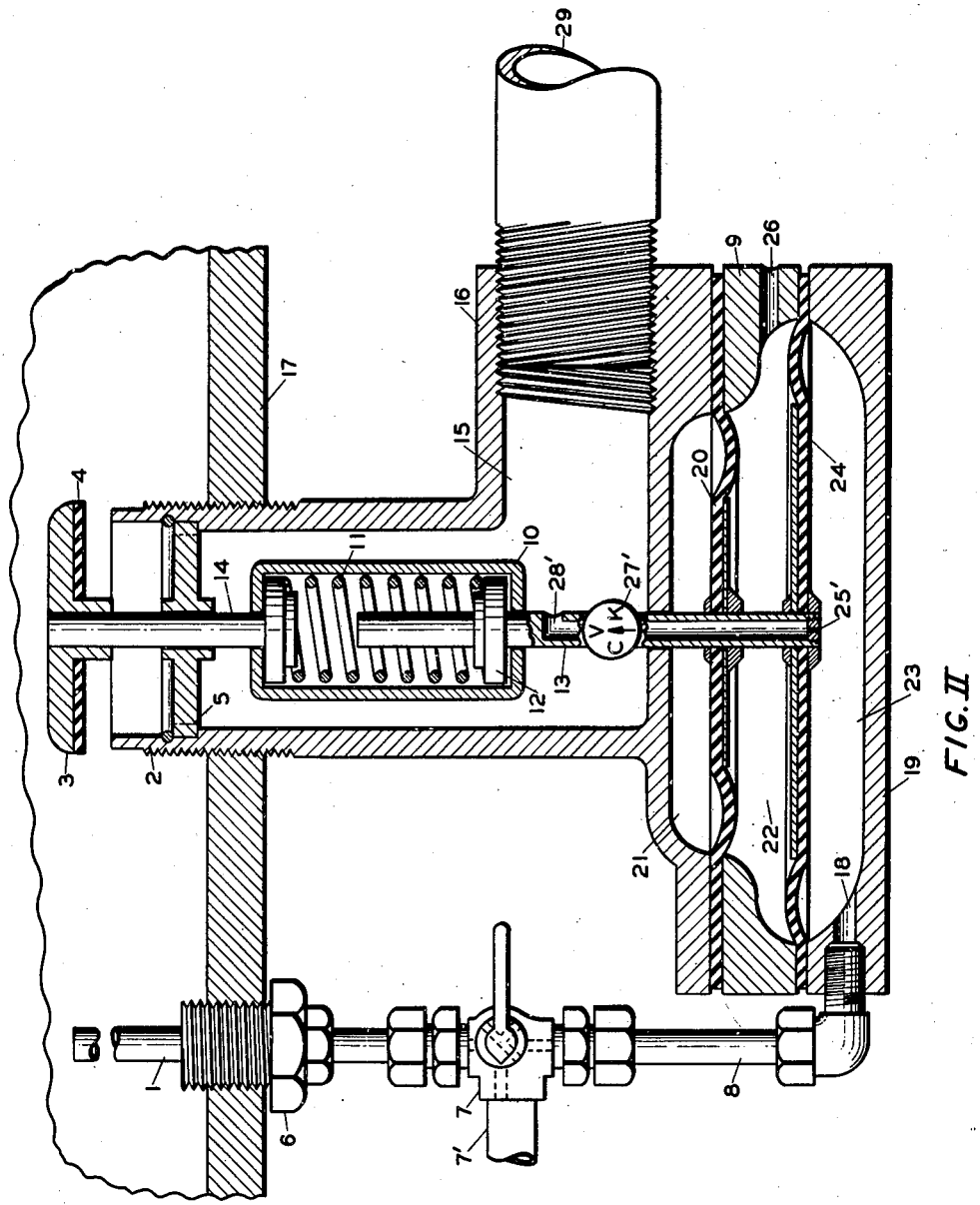

June 7, 1949.   O. L. GARRETSON   2,472,070
PRESSURE CONTROLLED LIQUID OUTLET VALVE
Filed April 15, 1946   3 Sheets-Sheet 3
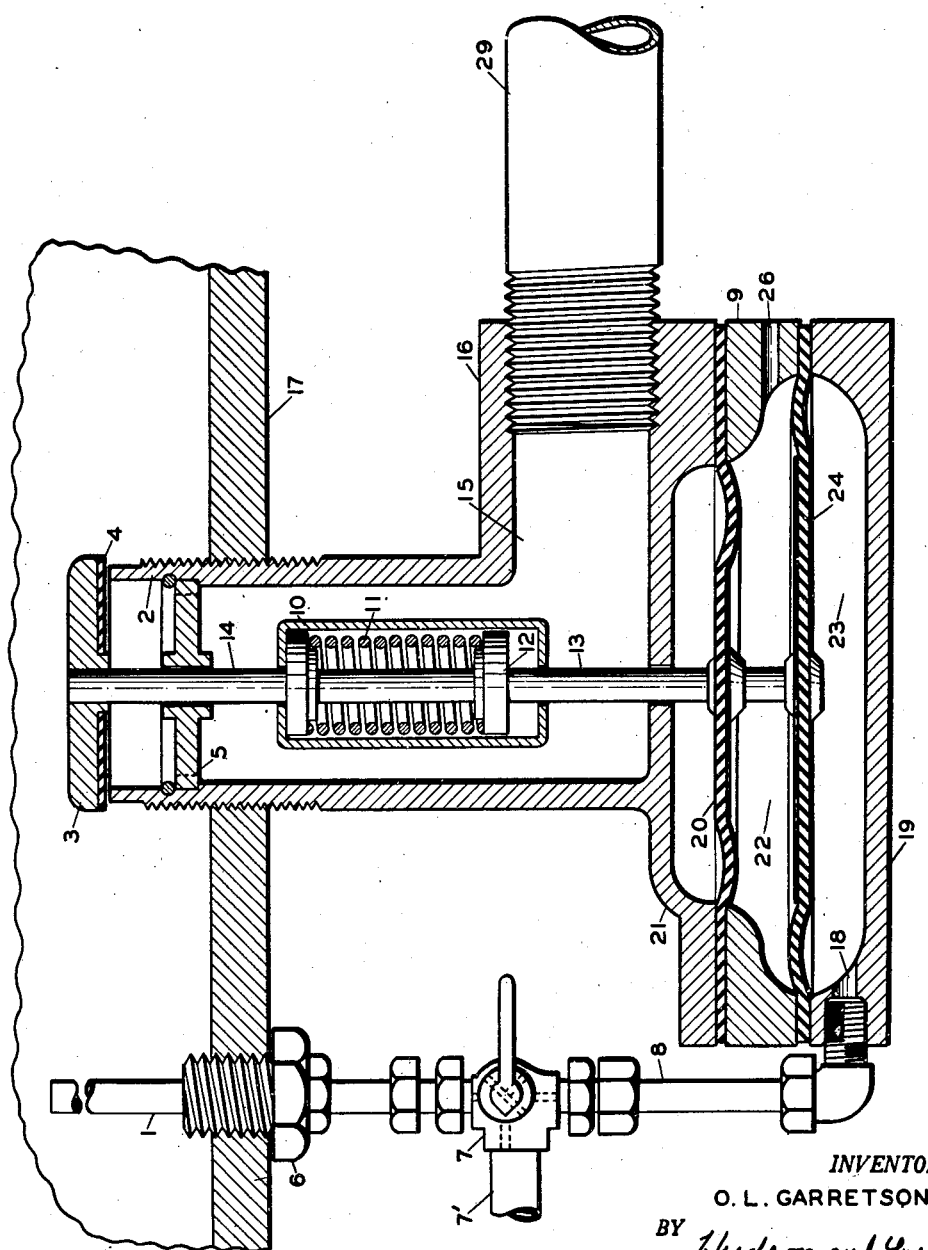
FIG. III
INVENTOR.
O. L. GARRETSON
BY Hudson and Young
ATTORNEYS Patented June 7, 1949

2,472,070

UNITED STATES PATENT OFFICE 2,472,070

PRESSURE CONTROLLED LIQUID OUTLET VALVE

Owen L. Garretson, Bartlesville, Okla., assignor to Phillips Petroleum Company, a corporation of Delaware Application April 15, 1946, Serial No. 662,370

4 Claims. (Cl. 137—68)

1

This invention relates to excess flow valves. In one particular embodiment it provides a valve mechanism which is capable of operating automatically to close a liquid outlet under conditions of excess flow and which may be operated by remote control to cause positive opening and positive closing of the liquid outlet at will.

One preferred use of this invention is as an internal excess flow valve for outlets of liquid petroleum gas containers, truck tanks, etc., but it is not limited to such use. It may be used in liquid outlet lines from any closed vessel containing liquid and gas, vapor or air under pressure.

Use of excess flow valves of conventional design on outlet lines of liquid petroleum gas containers has the great disadvantage of permitting small leaks in the outlet line between the excess flow valve customarily installed in the container at the entrance of the outlet line and the terminal hand valve with which the outlet line is usually closed. A partial breakage or leak in such location may not result in sufficient flow to cause an excess flow valve to close but may be sufficient to cause fire or explosion hazard and if prolonged will cause waste of much valuable materials.

An excess flow valve which may be installed in such containers at the junction of a liquid outflow line, and which may be positively closed when a leak is detected, is a very desirable improvement.

It is an object of this invention to provide an excess flow valve mechanism which may be positively closed at will, and which may be positively opened except under conditions of excess flow.

A further object is to provide means for positively opening and closing an excess flow valve by remote control.

Another object is to provide a strong and simplified excess flow valve mechanism which is rugged, foolproof and cheap in construction and which has the particular advantageous arrangement and combination of parts as shown and described.

Other objects and features of novelty will become apparent to those skilled in the art as this disclosure proceeds.

A special feature of this invention resides in the combination of an excess flow valve feature comprising a valve head, valve seat, a member adapted to resist seating of the valve head by predetermined force, and means comprising two fluid actuated diaphragms, for positively opening and closing the valve.

Figure I is a vertical section of one preferred embodiment of my invention. Figure II is a modification of Figure I. Figure III represents still another modification of Figure I.

Referring to Figure I of the drawing a body 2 having a fluid conduit 15 therethrough is shown inserted upwardly into a tank or other containing vessel 17. Body 2 has a base portion containing a cavity 21, 22, 23. This cavity has an inner portion of reduced cross section disposed adjacent to conduit 15 and an outer portion of enlarged cross section. Spaced, substantially parallel diaphragms 20 and 24 are disposed within the base of body member 2 and divide the cavity therein into chambers 21, 22 and 23. Diaphragms 20 and 24 are of unequal effective cross section; diaphragm 20 extending across the inner and smaller portion of said cavity and diaphragm 24 extending across the outer and larger portion. Both diaphragms are secured to the walls of the cavity by fluid tight attachment. This attachment may conveniently be made by constructing the base of body 2 with two detachable members: an annular member 9 having a vent 26 and a disc-like member 19 having raised edges and openings 18 and 25. The diaphragms 20 and 24 may be inserted between these members of the base when assembled but any alternative method of attachment may be used which forms a fluid tight seal with the cavity walls.

A moveable thrust member 13 is attached to diaphragms 20 and 24 and is adapted to be moved by elevation or depression of the diaphragms. Thrust member 13 extends slidably through a loosely fitting opening in the wall of conduit 15 and in conduit 15 enters housing 10. Such loosely fitting opening permits fluid to pass from conduit 15 into chamber 21 and vice versa. A supporting member 12 is attached to member 13 within housing 10 and is adapted to support and transmit thrust to resilient member 11. The lower portion of moveable valve stem 14 extends slidably into housing 10 and there is adapted to rest upon, receive thrust from and be moved by resilient member 11. Housing 10 is adapted to limit separation of thrust member 13 and valve stem 14. Valve stem 14 is guided and supported by supporting member 5 disposed within conduit 15. Member 5 may be of any desired design which provides adequate support and guidance for valve stem 14 without unduly restricting flow of liquid through conduit 15. Valve stem 14 carries a moveable valve head 3 to which a compressible sealing disc 4 is attached. Valve head 3 is adapted to be moved downwardly into position to substantially close conduit 15.

In the base of detachable member 19 the opening 18 communicates with a line 8, which communicates with a three-way valve 7. Line 1 provides communication from valve 7 to the interior of containing vessel 17 and there communicates with the gas under pressure in the space above liquid contained in said vessel. Line 7' connects valve 7 with the atmosphere. Valve 7 may be any three-way valve old in the prior art such as the one shown having a T-shaped passage in the moving part as indicated by dotted lines. This valve has the following three open positions:

(A) Providing communication between line 1 and line 8;

(B) Providing communication between line 8 and line 7'; and (C) Providing communication between line 1 and line 7'.

Position C however is not essential to my invention, but is merely a possibility in the preferred modification shown. Obviously the valve may be closed by turning the moving part to a position between open positions.

Line 28 and check valve 27 connect the opening 25 in base member 19 with outflow pipe 29. Check valve 27 allows flow of fluid toward the right only, as shown by the arrow, and does not allow fluid to flow back from outlet pipe 29 to chamber 23. Pipe 29 leads from conduit 15 to any desired point for delivery of liquid and is there conventionally closed by a hand valve (not shown).

Lines 1 and 8 may be of any desired length and shape, permitting valve 7 to be located at any convenient place.

Figure II represents an alternative construction of my excess flow valve and is similar to Figure I, with the exception that the means for communication between chamber 23 and conduit 15, namely, orifice 25, check valve 27, line 28, have been omitted and the communication between chamber 23 and conduit 15 is by means of orifice 25', check valve 27', and small conduit 28' contained in thrust member 13.

Operation

The following shows the operation of a preferred embodiment of my invention as illustrated by Figure I: Starting with valve head 3 lowered against body 2 to close conduit 15, valve 7 is manually turned to provide communication between line 1 and line 8. Gas under pressure then flows from the vapor space above liquid contained in containing vessel 17 through line 1, valve 7 and line 8 to chamber 23. Here the pressure of the gas actuates diaphragm 24, moving the diaphragm upward and carrying moveable thrust member 13 away from base member 19. The upward movement of this thrust member transmits pressure, via resilient member 11, to valve stem 14, tending to force valve head 3 upward away from its position on body 2 closing conduit 15. Movement of valve head 3 is prevented by pressure of liquid within container 17, and resilient member 11 is compressed.

Gas from chamber 23 flows through the opening 25, check valve 27 and line 28 into liquid outflow pipe 29 and conduit 15. When gas pressure in conduit 15 becomes great enough to enable resilient member 11 to move valve head 3 the valve head is lifted, opening the valve. In this position the valve functions as an excess flow valve. A break in the outflow pipe 29 allows pressure to escape from conduit 15 and liquid pressure within container 17, forces valve head down to close conduit 15 against the pressure of resilient member 11.

The valve can be closed at will by turning valve 7 to vent chamber 23 to the atmosphere. Pressure in chamber 21 is approximately equal to that in conduit 15 since thrust member 13 is not sealed gas tight with the wall of conduit 15. This pressure forces thrust member 13 downward, carrying housing 10 and valve stem 14 and valve head 3 with it. Valve head 3 is thus drawn into position to close conduit 15 and is retained in closed position by liquid pressure from within container 17.

Fig. III represents an alternative construction resulting in a slightly different method of operation and is similar to Figure I except that line 28, check valve 27 and opening 25 have been omitted and thrust member 13 has been made sufficiently long to move valve stem 14 enough to raise valve head slightly and permit leakage around the valve head when diaphragm 24 is forced away from base member 19 by gas pressure. This allows liquid from the container 17 to leak into conduit 15 until pressure therein builds up sufficiently for resilient member 11 to raise valve head 3 to its open position.

In this position the valve functions as an excess flow valve but does not seal the conduit absolutely tight against entrance of liquid while pressure remains in chamber 23. When the valve 7 is manipulated to vent chamber 23 to the air, pressure within chamber 21 forces thrust member 13 downward sufficiently to permit pressure of liquid within container 17 to force valve head 3 into position to close conduit 15 tightly. Operation is otherwise as described in the first preferred embodiment of the invention as illustrated in Figure I.

Many obvious changes in construction may be made by those skilled in the art without departing from the spirit of this invention which is defined and solely limited by the accompanying claims.

Having described my invention and explained its operation, I claim:

1. A pressure controlled excess flow valve comprising in combination: a valve body adapted to be inserted into a vessel containing liquid and gas under pressure, said valve body having a fluid conduit therethrough and having a base containing a cavity having an inner portion of smaller cross section disposed adjacent to said fluid conduit and communicating therewith, and an outer portion of larger cross section; a moveable valve head adapted to be moved to substantially close said conduit under excess flow conditions by pressure of liquid within said vessel containing liquid and gas under pressure; means for moving said valve head to open and close said conduit under conditions other than excess flow comprising in combination two spaced substantially parallel diaphragms arranged within said cavity in the base of said valve body dividing said cavity into inner, middle and outer chambers, namely, a smaller diaphragm arranged in the smaller inner portion of said cavity adapted to be moved away from said conduit by pressure from within said inner chamber and a larger diaphragm arranged in said larger outer portion of said cavity adapted to be moved toward said conduit by pressure of gas in said outer chamber, a moveable rigid thrust member centrally attached to both said diaphragms and slidably extending into said conduit adapted to be moved by said diaphragms, a compressible resilient member carried by said thrust member arranged in said conduit, a valve stem attached to said valve head, arranged to rest on and receive thrust from said resilient member adapted to compress said resilient member when pressure on said valve head is greater than the thrust exerted by said resilient member, means for limiting separation of said valve stem and said thrust member, means for conducting gas under pressure from within said vessel to said outer chamber, means for conducting gas under pressure from said outer chamber to said conduit, means for preventing flow of fluid from said conduit to said outer chamber, and means for venting said outer chamber to the atmosphere.

2. A pressure controlled excess flow valve comprising in combination: a valve body adapted to be inserted into a vessel containing liquid and gas under pressure, said valve body having a fluid conduit therethrough and having a base containing a cavity having an inner portion of smaller cross section disposed adjacent to said fluid conduit and communicating therewith, and an outer portion of larger cross section, said base comprising two detachable members, namely, an annular member disposed to surround the middle portion of said cavity and having a vent adapted to vent said middle portion of said cavity to the atmosphere, and an outer disc-like member disposed to enclose the outer portion of said cavity and having two openings communicating with the outermost portion of said cavity adapted to be connected to piping; a moveable valve head adapted to be moved to close said conduit under excess flow conditions by pressure of liquid within said vessel; means for moving said valve head to open and close said conduit under conditions other than excess flow comprising in combination two spaced substantially parallel diaphragms arranged within said cavity in the base of said valve body dividing said cavity into inner, middle and outer chambers, namely, a smaller diaphragm disposed across the smaller inner portion of said cavity adapted to be moved away from said conduit by pressure from within said inner chamber and a larger diaphragm disposed across said larger outer portion of said cavity adapted to be moved toward said conduit by pressure of gas in said outer chamber, a thrust member centrally attached to both said diaphragms adapted to be moved by said diaphragms and extending into said conduit through a wall thereof having an opening adapted to receive said thrust member and to permit transfer of fluid between said conduit and said inner chamber, a coil spring carried by said thrust member disposed in said conduit, a valve stem attached to said valve head arranged to rest on and receive thrust from said coil spring adapted to compress said coil spring when pressure on said valve head is greater than the thrust exerted by said coil spring, a housing disposed around said coil spring adapted to limit separation of said valve stem and said thrust member, a line of pipe adapted to lead gas under pressure from said vessel containing same to said outer chamber, a three-way valve in said line of pipe for admitting gas under pressure into said chamber and for venting said chamber to the atmosphere, means comprising a line of pipe for conducting gas under pressure from said outer chamber to said conduit, and means comprising a check valve for preventing flow of fluid from said conduit to said outer chamber.

3. In a valve of the class described in combination: a valve body having a fluid conduit therethrough; a moveable valve head adapted to be moved to open and close said conduit; means for transmitting force not exceeding a predetermined maximum to said valve head tending to move the same to open said conduit and for transmitting force to said valve head tending to move the same to close said valve comprising in combination a moveable rigid thrust member, a compressible resilient member carried by said thrust member, a moveable valve stem attached to said valve head adapted to rest upon and receive thrust from said compressible resilient member, a housing disposed to enclose said compressible resilient member and to receive slidably said valve stem and said rigid thrust member adapted to limit separation of said valve stem and said thrust member; a fluid actuated diaphragm attached to said rigid thrust member adapted to move the same in a direction to transmit force to said valve head tending to close said valve; and a second gas actuated diaphragm attached to said rigid thrust member adapted to move the same in a direction to transmit force to said valve head tending to open said valve.

4. A pressure controlled excess flow valve comprising in combination: a valve body adapted to be inserted into a vessel containing liquid and gas under pressure, said valve body having a fluid conduit therethrough and having a base containing a cavity having an inner portion of smaller cross section disposed adjacent to said fluid conduit and communicating therewith, and an outer portion of larger cross section; a moveable valve head adapted to be moved to substantially close said conduit under excess flow conditions by pressure of liquid within said vessel containing liquid and gas under pressure; means for moving said valve head to open and close said conduit under conditions other than excess flow comprising in combination two spaced substantially parallel diaphragms arranged within said cavity in the base of said valve body dividing said cavity into inner, middle and outer chambers, namely, a smaller diaphragm arranged in the smaller inner portion of said cavity adapted to be moved away from said conduit by pressure from within said inner chamber and a larger diaphragm arranged in said larger outer portion of said cavity adapted to be moved toward said conduit by pressure of gas in said outer chamber, a moveable rigid thrust member centrally attached to both said diaphragms and slidably extending into said conduit adapted to be moved by said diaphragms, a compressible resilient member carried by said thrust member arranged in said conduit, a valve stem attached to said valve head, arranged to rest on and receive thrust from said resilient member adapted to compress said resilient member when pressure on said valve head is greater than the thrust exerted by said resilient member and adapted to be moved sufficiently to slightly open said valve by contact of said rigid thrust member when said thrust member is fully advanced, means for limiting separation of said valve stem and said thrust member, means for conducting gas under pressure from within said vessel to said outer chamber, and means for venting said outer chamber to the atmosphere.

OWEN L. GARRETSON.

REFERENCES CITED

The following references are of record in the file of this patent:

UNITED STATES PATENTS

| Number | Name | Date |
| --- | --- | --- |
| 589,124 | Evertsen | Aug. 31, 1897 |
| 615,881 | McIntosh | Dec. 13, 1898 |
| 620,287 | Donnelly | Feb. 28, 1899 |
| 809,859 | Stulp | Jan. 9, 1906 |
| 2,162,779 | Leutwiler | June 20, 1939 |
| 2,179,267 | Miller | Nov. 7, 1939 |